May 6, 1947.　　　A. AMES, JR　　　2,419,939
BINOCULAR VISION TEST
Filed March 31, 1943　　　8 Sheets-Sheet 1

Inventor
Adelbert Ames jr.
by [signature]
his Att'y.

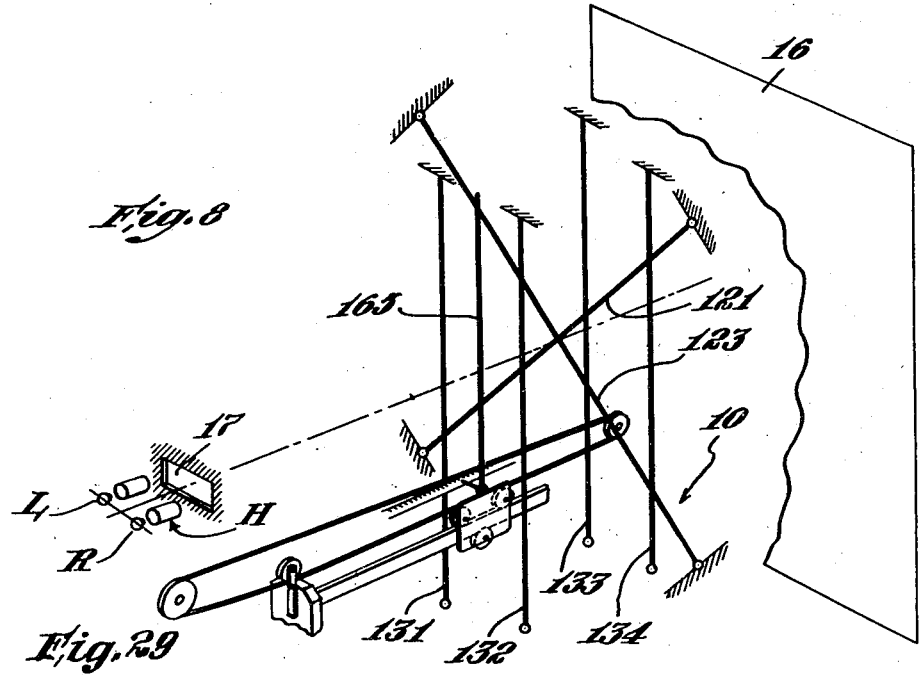
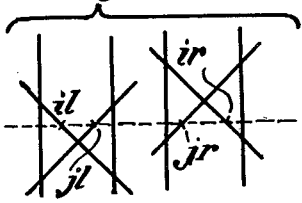
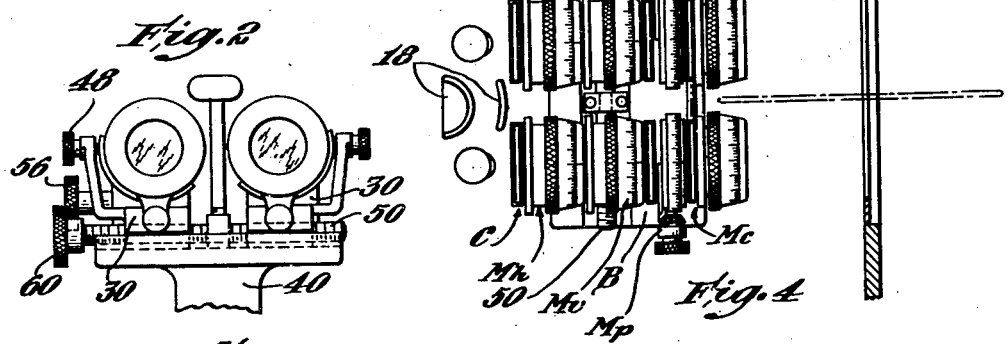
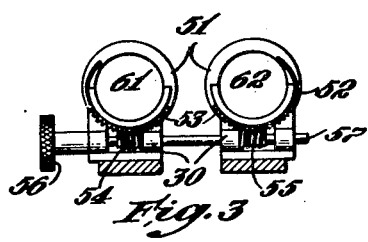

May 6, 1947.　　　A. AMES, JR　　　2,419,939
BINOCULAR VISION TEST
Filed March 31, 1943　　　8 Sheets-Sheet 3
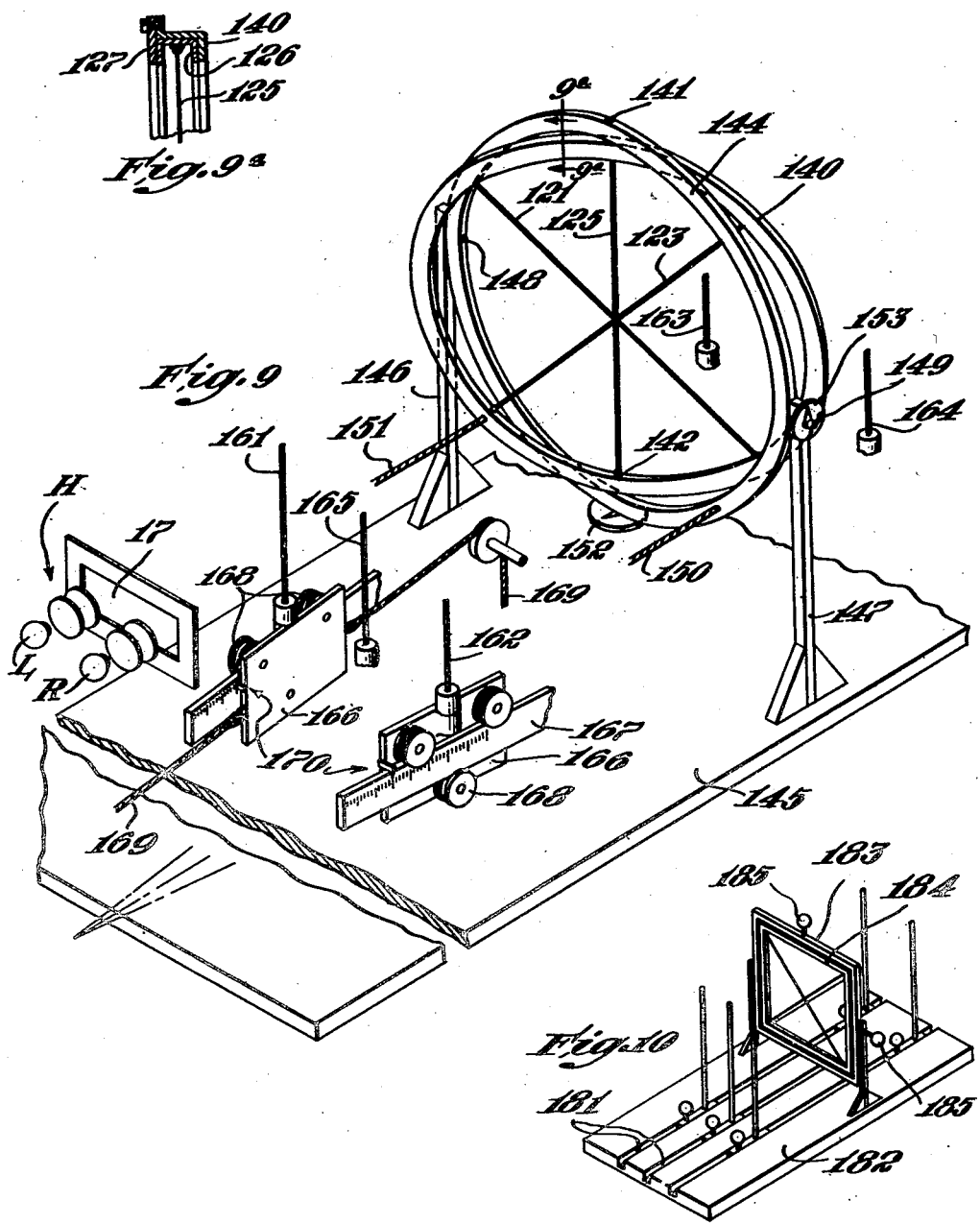

May 6, 1947.　　　A. AMES, JR　　　2,419,939
BINOCULAR VISION TEST
Filed March 31, 1943　　　8 Sheets-Sheet 4

Inventor
Adelbert Ames jr.
by Rudolf Lamann
his Atty.

May 6, 1947.  A. AMES, JR  2,419,939
BINOCULAR VISION TEST
Filed March 31, 1943  8 Sheets-Sheet 6
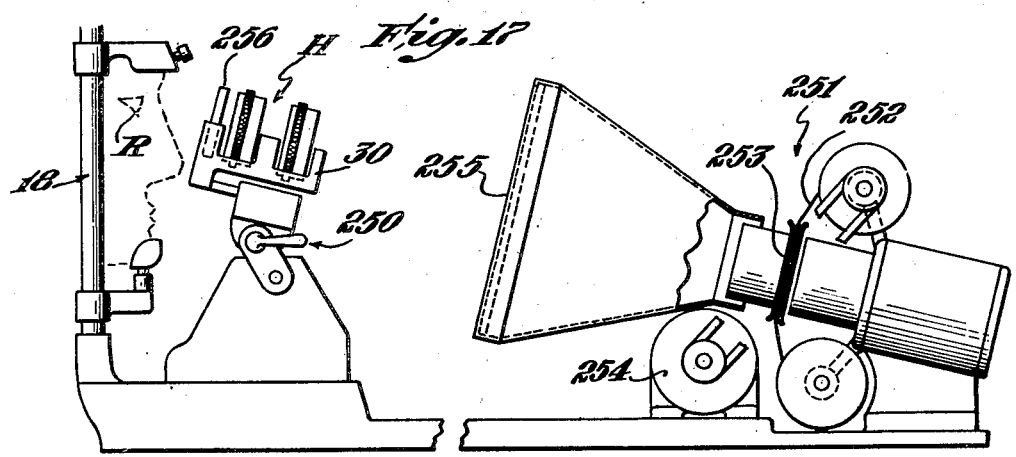
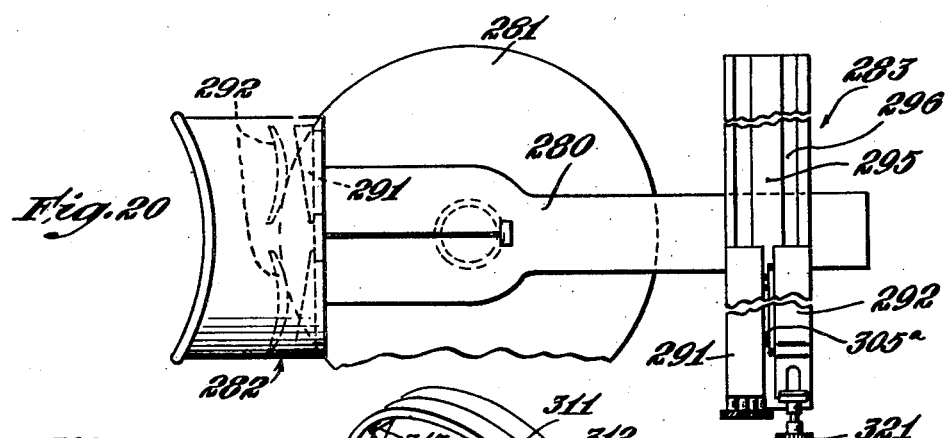
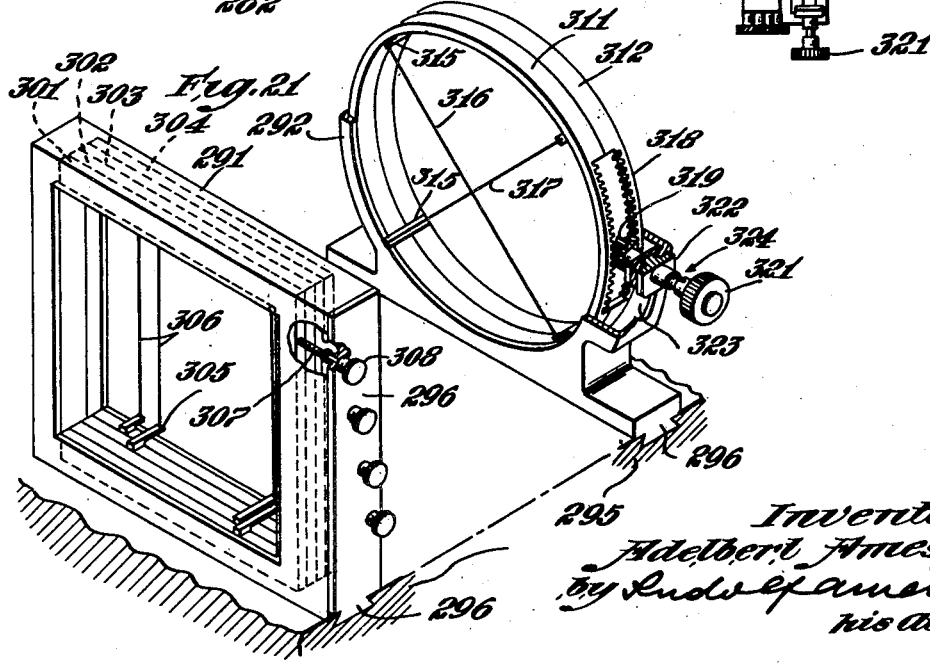
Inventor
Adelbert Ames jr.
by Ludw. Amann
his atty.

May 6, 1947.  A. AMES, JR  2,419,939
BINOCULAR VISION TEST
Filed March 31, 1943    8 Sheets-Sheet 7
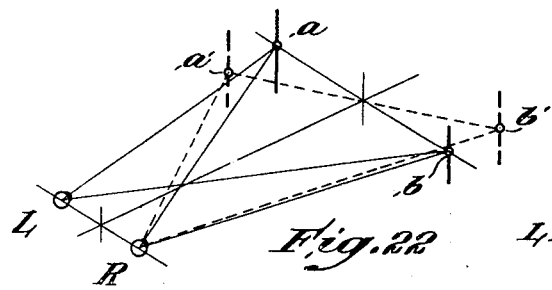
Fig. 22
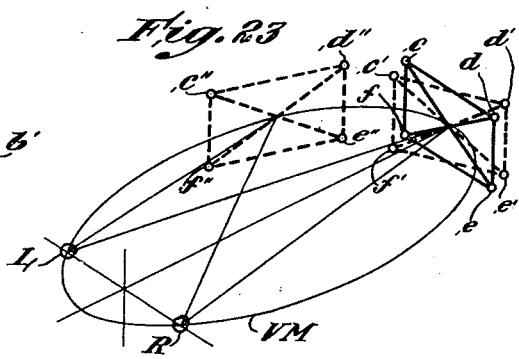
Fig. 23
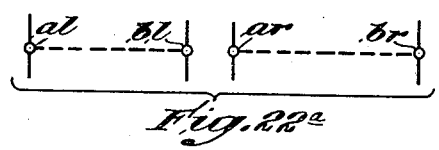
Fig. 22ª
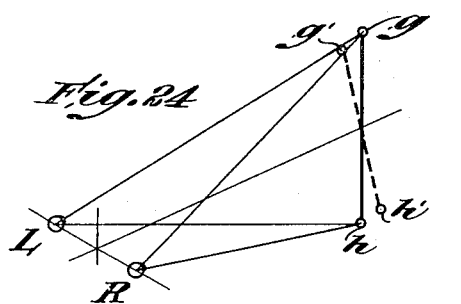
Fig. 24
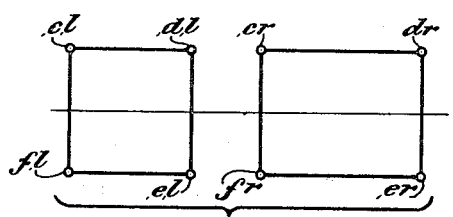
Fig. 23ª
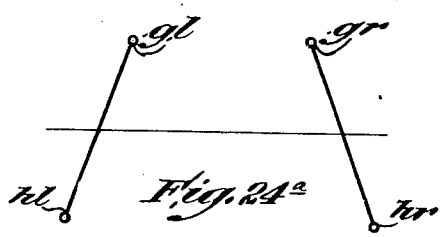
Fig. 24ª
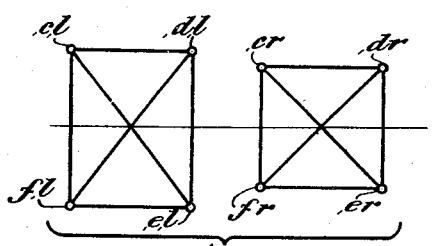
Fig. 23ᵇ
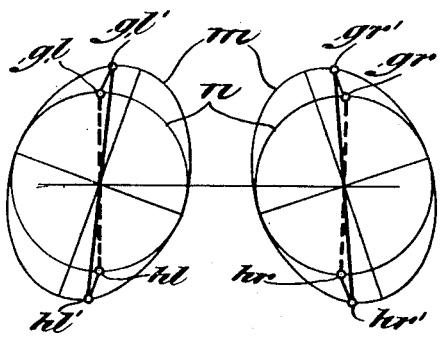
Fig. 24ᵇ
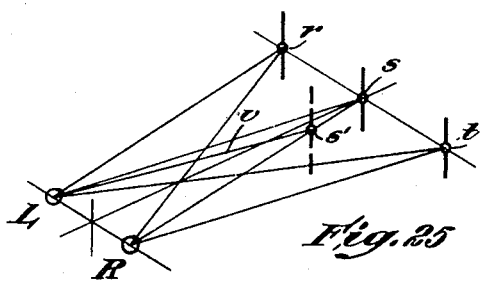
Fig. 25
Inventor
Adelbert Ames jr.
by Rudolf Amann
his Atty.

May 6, 1947. A. AMES, JR 2,419,939
BINOCULAR VISION TEST
Filed March 31, 1943 8 Sheets-Sheet 8
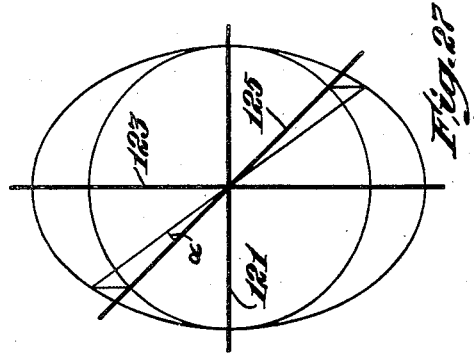
Fig. 27
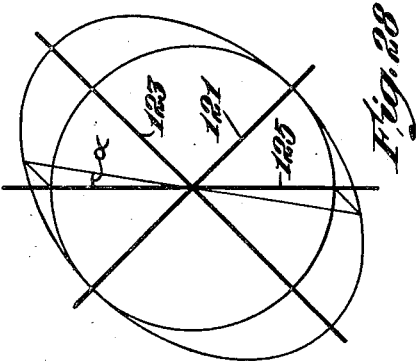
Fig. 28
Fig. 26
| TYPE | IMAGE RELATION | SPATIAL LOCALIZATION | | | | | | |
|---|---|---|---|---|---|---|---|---|
| NORMAL | | | | | | | | |
| HORIZONTAL | | | | | | | | |
| VERTICAL | | | | | | | | |
| OVERALL | | | | | | | | |
| ROTATORY | | | | | | | | |
| OBLIQUE | | | | | | | | |
| ASYMM'Y. | | | | | | | | |
Inventor
Adelbert Ames jr.
his att'y.

Patented May 6, 1947

2,419,939

UNITED STATES PATENT OFFICE 2,419,939

BINOCULAR VISION TEST

Adelbert Ames, Jr., Hanover, N. H.

Application March 31, 1943, Serial No. 481,181

28 Claims. (Cl. 88—20)

The present invention deals with an improved test of spatial localization, and especially with the differentiation of the influence upon spatial localization of various types of ocular image incongruity.

For the purpose of determining the quality of binocular vision, tests are in common use all of which are concerned with an evaluation of the accuracy with which an observer can judge the relative distance between closely juxtaposed test objects. Such tests are based on the assumption that binocular vision provides a basis only for a more accurate judgment of the axial distance or depth. More thorough investigation, however, has shown that binocular vision provides a basis not only for judging the relative distances of foveally seen objects but also for definite localization of all objects in the field of view relative to the observer. The conventional tests may permit detection of the presence or absence of binocular spatial localization (the meaning of this term will become clear from the following discussion of the concepts envolved) generally, and of accuracy of depth perception regarding two laterally juxtaposed objects, but they do not provide any indication regarding spatial localization in the above-mentioned wider sense; an observer may have specifically very accurate depth perception and yet be unable correctly to localize objects relative to himself and to each other.

Several test methods and test instrumentalities for demonstrating, detecting and measuring defects of spatial localization as affected by the various factors affecting binocular vision based on the above-mentioned investigations and more useful than the conventional tests, have been proposed by, or in collaboration with the present inventor.

The so-called Eikonometer Test (U. S. Patents Nos. Re. 19,841; 2,095,235, 2,126,713 and 2,238,-207) permits direct and exact measurements of that factor of binocular spatial localization which lends itself easily to exact appraisal, namely, the ocular image incongruities of a person—without, however, furnishing direct information concerning the person's binocular spatial localization, with its functional implications.

The so-called Tipping Field test (U. S. Patent No. 2,168,308) furnishes direct information concerning binocular spatial localization, permits a certain evaluation of the effect of uniocular and binocular factors upon binocular spatial localization, and also permits fairly exact detection and measurement of image incongruities through peculiar control of that mutual effect. On the other hand, this test, although it works with three dimensional test objects, emphasizes two dimensions of these objects so that it does not always fully represent the conditions under which binocular spatial localization actually operates.

The test methods exemplified by the so-called Leaf Room test (copending application Serial No. 334,511, filed May 11, 1940), although able to demonstrate the effect on spatial localization of ocular image incongruities and to detect them under conditions very closely reproducing binocular vision in natural environments, does not lend itself to exact differentiation or measurement of basic types of anomalous spatial localization.

It is the principal object of the present invention to provide a test and test means furnishing direct information as to the nature of a person's visual sensation especially as to localization of objects not only concerning axial distance but also the position of such objects relatively to the observer and to each other, which test also discloses, and reliably differentiates between, certain regular types of abnormal relationship of the ocular images envolving corresponding types of abnormal localization, and permits quantitative determination of such anomalies.

For that purpose, namely, the measuring of these anomalies, the testing instrument and the test methods according to the invention are based on the controlled use of the various factors or components which determine spatial localization while emphasizing the effect of the dissimilarities of the ocular images which provide purely stereoscopic localization, certain typical irregularities of these dissimilarities causing corresponding abnormal localization.

In one of its aspects, the invention provides an instrument for testing spatial localization which has target elements so grouped or shaped and organized that differentiation and measurement of the various types of anomalous ocular image incongruity become possible.

In another aspect, the new instrument permits for purposes of such tests as above indicated, the control and, if desired, essential elimination, of factors which tend to interfere with purely stereoscopic space perception.

In a further more specific aspect, the invention provides a test presenting to the person to be tested an object containing a minimum of uniocular localization factors, having one group of test elements which responds definitely only to one combination of disparity types (for example, overall and horizontal size differences), and a second group of test elements three dimensionally correlated to the first group and responding definitely to a second combination of disparity types including a type of the first combination (for example, vertical and horizontal size differences). By combining element groups (if desired more than two), at least one of which responds differently to at least two different types of incongruity to which it is sensitive, it becomes possible to differentiate between any number of incongruity types, as will clearly appear below.

In still another aspect of the invention, the amount of abnormal image disparity, the type of which was first qualitatively established by a certain relative localization of the above-mentioned element groups, may then be quantitatively determined in various ways. For example, the elements may be mechanically moved until localization is established, and the amount of disparity derived from this movement, or normal localization may be established by optical test means in front of the patient's eyes, which test means indicate the amount of disparity. Instead of presenting an actually three dimensional test object, such an object may be simulated by stereoscopical presentation of two dimensional records either permanently applied to targets or stereoscopically projected on a screen. In that case, object changes may be accomplished by mechanically adjusting the targets or slides, or by optically affecting the light beams projected through the slides, or by serially projecting stereoscopic slides or films representing test objects that vary from each other at an appropriate rate of change, in ways characteristic of the anomalies to be investigated.

The test according to the present invention also permits, as a peculiar feature, the direct determination of the purely functional meaning of faulty spatial localization. According to this aspect of the invention, it is one of its objects to provide a test for the direct selection, recordation and evaluation of certain types of abnormal spatial localization not in terms of the image incongruity which might cause such faulty localization, but in terms directly derived from the observation where a person having some such incongruity, sees an environmental object whose position and configuration may have particular meaning in that person's activities.

These and other objects, aspects and features of the invention will be apparent from the following description of several embodiments illustrating its character. This description refers to drawings, in which Fig. 1 is a diagrammatic representation of one embodiment of a testing arrangement according to the invention;

Fig. 2 is a front elevation of the optical head indicated in Fig. 1;

Fig. 3 is an elevation of the rear element of the optical head shown in Fig. 2 with the support in section, seen from the left-hand side;

Fig. 4 is a top view of the head according to Fig. 2;

Fig. 8 is a diagrammatic representation of another embodiment of a testing arrangement according to the invention;

Fig. 9 shows a mechanically adjustable modification of the arrangement according to Fig. 8;

Fig. 9a is a detail section along 9a—9a of Fig. 9;

Fig. 10 shows a demonstration model for use with arrangements according to Figs. 8 and 9;

Fig. 17 is a front elevation of a projector instrument constructed similar to the arrangements shown in Figs. 11 to 16;

Fig. 20 is the top view of a stereoscopic viewing device incorporating mechanically adjustable stereo targets;

Fig. 21 is an axonomatic representation of the device according to Fig. 20;

Figs. 22 to 25 are diagrams illustrating the functional basis of tests according to the invention;

Fig. 26 is a table showing differentiation of spatial localization effects, according to the invention;

Figs. 27 and 28 are diagrams illustrating differentiation of rotatory image differences, according to the invention; and Fig. 29 indicates the ocular images of a target similar to that of Fig. 8, seen by an observer having vertical fixation disparity.

Figure 7:
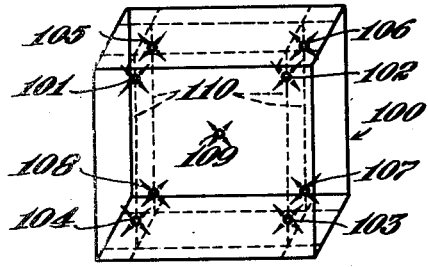
Fig. 7 shows a modification of the arrangement according to Fig. 1.

The present invention is based on the observation and reinterpretation of previously unobserved or misinterpreted facts concerning the nature and relationship of the various factors that affect spatial localization in both monocular and binocular vision. Theoretical considerations concerning this problem so far as set forth in my co-pending application Serial No. 334,511, filed May 11, 1940, will be only briefly outlined herein for the purpose of recapitulation, but in certain instances the concepts and the terminology of this theory will be modified and supplemented in the light of more recent work, and for specific purposes of the present invention.

An observer's eyes receive from the external environment visible radiation whose wave direction and wave configuration (defined by amplitude and wave length) constitute, so far as purely visual sensation is concerned, the only direct contact between the observer and his environment. These light rays produce in the eyes dioptric images which provide stimulus patterns for the retinal receptor processes, which patterns are in their turn transmitted, through the neuromechanism of opticus, geniculate bodies and visual radiation tracts, to the occipital lobes of the brain.

The phenomena in the chain of transmission from the light radiating environment to the cortex of the observer, which chain includes as links the physical apparatus of the eyes and the physiological neuromechanism, bear in themselves only a purely symbolical relation to the environment. It should be especially kept in mind that the translating connection between the above-mentioned physical and physiological links, namely the retinal receptor mosaic, has no other function than to transmit impulses representing a diffentiation of the wave direction and configuration characteristics of the light flux impinging thereon. This differentiation envolves separation according to wave direction into two-dimensionally distributed stimulus elements, going hand in hand with discrimination between these elements according to wave configuration. In other words, the eyes constitute translation mechanism transmitting two-dimensional stimulus patterns which are symbols representing certain selected differentials of properties of the light flux received by the eye, but in themselves cannot furnish positive information as to the nature of the external environment.

In uniocular vision the pattern symbols are, as indicated above, characterized by differentiation as to nondirectional quality (physiologically derived from and, by phylogenetically acquired apparatus, definitely related to configurational differentiation of the impinging light waves) together with differentiation as to directional quality (physiologically derived from and, by phylogenetically acquired apparatus, definitely related to the directional differentiation of the impinging light waves); in binocular vision, the combination of the two uniocular pattern symbols is characterized by the difference in directional differentiation (physiologically derived from and, by phylogenetically acquired apparatus, definitely related to the difference of directional differentiation of the light rays impinging on the respective eyes).

Visual sensation comes into being through higher mental processes which, continuously initiated by the pattern symbols coming from the external environment, synthesize memory factors of significant past events for prognostication of the effect of future action. In this synthesis, the immediate visual symbols pattern is coeffective with the continuously accruing general experience of the nature of objects furnishing memory factors of which relative direction, size, form and localization are, at least for present purposes, of primary importance for determining what we see as every instance becomes a component of the past. It will be evident that, in this context, the meaning of "experience" or "memory" is not limited to conscious recollection but embraces the entire ontogenetic development so far as it is significant in any particular situation.

The physiologically evaluable contents of the visual sensation which is at any moment initiated through the pattern symbols transmitted by one eye may be termed "ocular image," which term has previously been defined as the final impression received in the higher brain centers through the vision of one eye.

Evidently, visual sensation is in a category quite different from that of the immediate external environment including the retinal image (it is therefore somewhat misleading closely to relate these two concepts by terming them "subjective" and "objective" fields, respectively) since it represents the contents of past as well as present significance for the individual in question, of his environment as related to him through light waves. In other words, what we experience as localization, size, form and color (although evoked by the stimulating directional and configurational characteristics of the impinging light waves) is not something solely and directly attributable to the presentational environment, but the meaning or significance of certain symbols, existing only in our consciousness.

Although it is impossible directly to compare the realm of our visual sensation with the realm of external environment, it is nevertheless possible to correlate visual sensation and environment with the aid of the concept "normal visual sensation." Visual sensation can be postulated to be "normal" if it conforms to the environment to the extent that the observer will be able to identify objects by functional activities other than pure vision, where and as what they are indicated to him by his vision, for the following reasons including certain limits of approach.

Obviously, there exists, for any particular situation, an optimum degree of agreement between events experienced in visual sensation and events as they are or might be experienced due to all characteristics (including the stimulus patterns) which are adapted to become effective in forming this total experience of such events.

Such practical optimum agreement in various practical situations will more or less approach a complete agreement of localization in visual sensation, to general completely exact localization by any means whatever. Although such complete agreement and such exact localization are inconceivable and unattainable, the approach to these ideals can nevertheless be carried to any desirable degree of exactness. It is therefore permissible to postulate a "normal" visual sensation formed in ideally normal manner by ideally normal factors, and to postulate, further, one-to-one correspondence of a reference system of ideal localization in visual sensation to a reference system of ideal general localization as ascertained by scientific methods of any desired kind and exactitude. It becomes thus logically possible to carry out metrical operations in the realm of sensation, in mathematical and generally scientific terms of the realm of general external environment, and to relate abnormal visual sensation, resulting from less than ideal factor and factor synthesis, to normal visual sensation and to the scientifically ascertainable general characteristics of the environment.

On these premises it is permissible to refer to "abnormal," or "distorted," or "inconsistent" relative direction, size, form and localization, in the sense that an arrangement of things in space as perceived by way of abnormal visual sensation, differs from the arrangement as inductively ascertained and metrically evaluated by way of topographical methods, so far as the two ways can be at all correlated; if no such difference can be determined, visual sensation including spatial localization is "normal," or "nondistorted," or "consistent."

For purposes of describing visual phenomena the visual sensation may be referred to three planes, namely, the median plane, a frontal plane, and a plane through both eyes and normal to both other planes. If these planes occur in normal visual sensation as above defined, they form a system which can be used as a reference system for metrically localizing objects appearing in this normal sensation. If the sensation of an individual is abnormal or distorted, the size, form and localization of its elements can be correlated to these factors in the reference system of normal sensation, and through it to the external environment, by geometrical transformation. At least qualitative, and in certain instances quantitative mathematical rules can be given for these transformation movements, which rules (not to be confused with those of geometric optics which correlate stimulus pattern and environment) thus correlate factors acquired in past experience.

The above-mentioned factors or characteristics of visual sensation, namely, "relative direction," "form," "size," "localization," will now be discussed somewhat more in detail.

In uniocular vision, what becomes visual sensation is, as pointed out above, the prognostication of effective action in the immediate external environment, given rise to by the particular differentiation of the ocular image, initiated by differentiation of the stimulus pattern resulting from the particular relationship of wave direction and configuration of the impinging radiation. Where things are seen, that is their localization, depends on the following factors. The position in space relative to the observer, including both distance and direction at which an object of unequivocal significance is seen, depends mainly upon the relationship of sense of relative directions and size of the object, apart from such factors as sense of relative brightness and contrast which, although generally speaking as important as those previously mentioned, may be disregarded for present purposes. The relative disposition of a group of such objects or its form is given by the same two factors. It should be noted in this connection that form is not a basic factor in uniocular vision but a derivative of size and direction factors. The orientation of a group of objects relatively to the observer is given by these same factors.

In binocular vision, what is seen is (in addition to whatever may be derived from uniocular vision) the meaning of external phenomena as given rise to by the difference in particular differentiation of the ocular images, initiated by difference in differentiation of the stimulus patterns resulting from the particular relationship of wave direction and configuration of the impinging radiation. Where things are seen depends on the following factors. The position in space relative to the observer, including both distance and direction, at which an object of unequivocal significance is seen depends in true binocular vision directly upon the difference or incongruity, due to the lateral displacement of the eyes, between the ocular images given rise to by the stimulus patterns in the two eyes and the sense of form of the object. It is very important to note in this connection that form is a basic factor in binocular vision and that the particular form of an object is quite instrumental in localizing an object in subjective sensation through differences between the ocular images. This circumstance is made use of for purposes of the present invention by systematically shaping test objects in such a manner that their localization will be typically affected by certain changes of these image differences. Since the position of an object in space relative to the observer is directly given by binocular vision, the relative disposition of a group of objects and its orientation is also given. The sense of the size of an object is of secondary importance in binocular localization.

Under conditions where size factors are available, uniocular and binocular vision substantiate each other. Under conditions where size factors are not available but form factors are, the localization is determined solely by the relationship between the directional factors and by the form factors.

As pointed out above, the discrepancy between ideally normal and individual visual sensation, or distorted spatial localization, may be due to abnormality or lack of any one of the factors contributing to the sensation. In binocular vision, abnormal difference between the ocular images is one of the principal factors in this respect, and it is that factor whose effect was first quantitatively evaluated, before the above-outlined correlation of all factors envolved was fully appreciated.

It should be noted that the concept ocular image "difference" or "incongruity" as herein used does not refer to those normal differences of the dioptric or retinal images which are the base of normal sensation in true stereoscopic vision, but to discrepancies beyond these differences, which phenomenon is also referred to as aniseikonia. The literature refers sometimes to "normal" and "abnormal" aniseikonia, but I wish it to be understood that I am herein using the terms "aniseikonia" or ocular image "incongruity" or "difference" only for discrepancies beyond those which provide "normal sensation" in the above-described sense.

In accordance with the present invention, abnormal spatial localization is detected while practically excluding or introducing to degrees controlled for specific purposes of the test, certain factors determining spatial localization excepting differences of the uniocular images. In this manner, the correlation between image difference and spatial localization can be definitely established, and the nature and amount of abnormal image differences derived from typically abnormal localizations effected by these abnormal differences or incongruities. It was difficult to accomplish this result to fairly satisfactory degrees of accuracy, and especially difficult to distinguish between various types of image incongruities, before the relation of past experience and visual sensation was clearly realized. Only when concepts were developed which permit evaluation of the effect of the various components of visual sensation became it possible to isolate in a functional test the effects of image incongruity by positively controlling the effects of other components.

For carrying out tests of this type, various embodiments of testing apparatus incorporating the above-mentioned concepts may be used, depending upon the particular aspect of the phenomenon of spatial localization or image incongruity to be investigated.

One such embodiment which brings into play a minimum amount of factors other than image incongruity will first be described with reference to Fig. 1. This testing arrangement employs as test target a combination of point objects, for example, small lamps or highly polished steel balls 1 to 9 suspended on invisible wires indicated at 15 before a black velvet backing 16 and viewed through an aperture 17 which restricts the observer's binocular field of view to the test elements. These points are distributed relatively to the eyes L and R as indicated by the parallelepiped P shown in dotted lines. The point objects form two groups, namely, group I, consisting of elements 1 to 4, and group II, consisting of elements 5 to 9. The functional significance of this particular arrangement will become apparent from the explanation of its use hereinbelow.

Small steel balls suspended on black threads and illuminated by a floodlamp (not shown) behind the observer have been found quite satisfactory as test elements since the reflection from their apexes constitutes light points conveying practically no clue of size or form.

Figure 1:
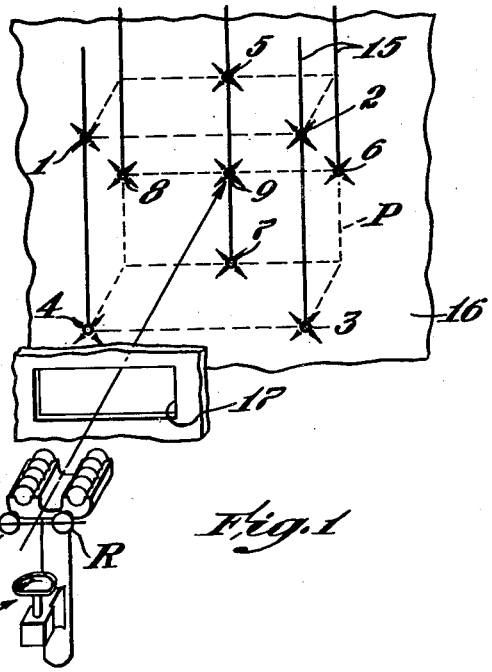

In front of the eyes may be placed (if desired on a headrest 18 suitable for reproducibly fixating the eyes relatively to the test target) an optical head, indicated at H of Fig. 1, for modifying the images carried by the impinging light rays in ways conforming to certain types of abnormal dissimilarity between the two ocular images, to be detected with the test target in question.

For differentiating between those image differences which have so far been found most typical and which will be discussed more in detail hereinafter, the optical head for each eye may include, as shown in Figs. 2 to 4, two separate units $Mh$, $Mv$ for gradually adjusting the size of the respective images in the horizontal and vertical meridians, respectively, a unit $Mp$ for gradually adjusting the prismatic distortion in the horizontal meridians, a unit Mc for introducing gradually adjustable meridional size changes in meridians whose obliqueness can be controlled simultaneously for both eyes, and conventional trial lens holders B and C for additional optical elements.

Figure 5:
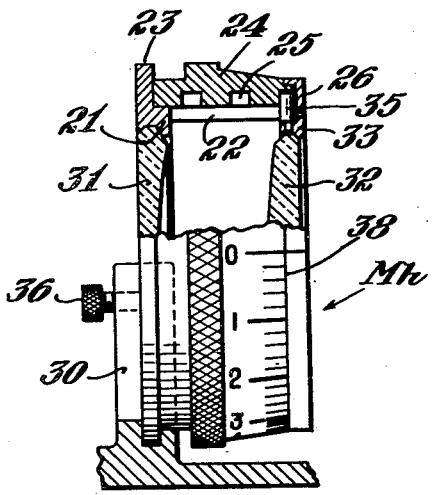
Fig. 5 is a longitudinal section through one of the adjustable magnifying systems shown in Fig. 4.

The size units Mh and Mv and Mc may be of the type shown in Fig. 5. In this figure, 21 is a mounting sleeve having a slot 22 and a flange 23. On sleeve 21 rotates a ring 24 having an inside helical groove 25 and being held on sleeve 21 by means of an annular plate 26 screwed to sleeve 21. One lens element 31 is fixed to sleeve 21, and the second lens 32 to mount 33 which also carries a follower 35. Sleeve 21 is rotatably mounted in supports 30 (Figs. 2 and 5) and can be fixed relatively thereto by suitable means, for example, set screw 36. By means of flange 23 and screw 36, the meridians of the size lens systems Mh, Mv and Mc can be adjusted, and by rotating ring 24, the distance of lens element 32 from element 31 can be changed, thereby adjusting the magnification according to the principle described in Patent No. 2,107,305. The amount of magnification change can be read from scale 38.

The asymmetry units Mp may be of the type schematically indicated in Fig. 6, where 41 and 42 are two distortion prism elements, as for example described with reference to Figs. 14 and 18 of my Patent No. 2,118,132. These elements are mounted in the manner of the Risley type prisms, namely, rotatable in opposite directions by means of gear mounts 43, 44 turning within ring 45, by means of an auxiliary pinion 46 rotatably mounted on ring 45 which is carried by one of the holders of stand 30 in the manner indicated in Fig. 5 for the adjustable size lens Mh. By rotating gear rim 47, for example, with the aid of hand knobs 48 mounted on holder 30 (Figs. 2 and 4), an asymmetric distortion of the light beam can be introduced and continuously adjusted without also introducing a prismatic deflection, in planes determined by the position of mounts 45 relatively to supports 30.

The oblique size units Mc may incorporate, as shown in Figs. 3 and 4, two lens holders 51 rotatably supported in grooved rings 52 on supports 30 and provided with gear segments 53 meshing with right and left-hand worms 54, 55 respectively. By rotating a hand knob 56 fastened to worm shaft 57 on which worms 54, 55 are suitably fastened, it is possible to rotate adjustable meridional size lenses 61 and 62 to equal amounts in opposite directions.

As shown in Figs. 2 to 4, supports 30 are slidably fastened to stand 40 on which they can be shifted in opposite directions by means of a right and left-hand screw arrangement 50 which permits adjustment of the pupillary distance by rotating knob 60.

In addition to these units, test lenses, or aperture plates, or sheets of polarizing material may be inserted in cells B and C for purposes to be described below.

The above-described point objects may be replaced by stereoscopically projected point targets, as will be described in more detail below.

The point target according to Fig. 1 introduces a minimum of form factors and is especially suited for primary tests having mainly the purpose of qualitatively detecting, with a high degree of sensitivity, the presence of abnormal spatial localization. If abnormal image differences are to be measured quantitatively by way of the corresponding abnormal spatial localization, it was found desirable to add form factors which facilitate quantitative judgment.

Fig. 7 shows a target of that type which comprises point objects 101 to 109 similar to those of Fig. 1 and in addition a comparison element which accentuates nondisparity factors to such an extent that its form is little affected by disparity changes so that abnormal localization of the point elements can be related thereto for measuring. Such a comparison element is, for example, a skeleton cube 100 whose linear elements will rather rigidly retain their vertical and horizontal position against which the positions of the point elements 101 to 109 can be measured.

The point elements 101 to 109 are arranged within the cubical wire cage 100, as indicated by the dotted construction lines 110 of Fig. 7; again the elements may be concrete objects, or the target may be reproduced by stereoscopic projection. In the latter arrangement, the point elements and the standard element may be projected with separate systems so that the former can be optically modified without affecting the latter or vice versa.

Instead of relating point objects to a three-dimensional standard constituting a rather rigid form determinant, the measuring elements themselves may be shaped and organized in such a manner that their relative localization permits fairly accurate quantitative measurements.

In an embodiment of this type, the test object portion of the instrument may consist, as shown in Fig. 8, of an oblique cross made up of two smooth cords 121 and 123 stretched at right angles to each other, and of two pairs of smooth vertical plumb cords 131, 132, 133, 134, two in front and two behind the cross. A neutral backing 16 is arranged behind this target. A cross extending from the corners of a five-foot square frame and set up vertically a distance of three meters from the subject's eyes was found to be satisfactory. The plane of the cross should be carefully mounted at right angles to and equidistant from the median plane in normal sensation. The vertical plumb cords may then be suspended 60 cms. in front of, and behind the cross, respectively; if separated about 50 cms. they will then subtend an angle of approximately 12° to the observer. Suitable aperture means 17 restrict the subject's binocular field of view to the test elements, and optical heads H may be arranged before the observer's eyes, as described with reference to Fig. 1.

It will of course be understood that the above dimensions and the angle of observation may be changed in accordance with particular requirements.

In Figs. 1, 7 and 8, the targets are shown to be mechanically fixed, changes of the visual sensation being brought about only optically by means of optical head H (Figs. 1 to 6). It may sometimes be desirable to carry out tests by mechanically adjusting the target; an arrangement serving that purpose is shown in Figs. 9 and 10.

In Fig. 9, the threads 121 and 123 of Fig. 8 are stretched across a circular frame 140 which, cardan joint fashion, is pivoted at 141, 142 within a second frame 144 swinging at 148, 149 on uprights 146, 147 which are mounted on base 145.

The angle formed by threads 121, 123 may be bisected by a third thread 125, and the threads may be so mounted in frame 140 that either can be swung into vertical position. As shown in Fig. 9a, this can be accomplished by fastening the threads to a circular channel 126 sliding on frame 140 proper within which it is confined by a cover plate 127.

By moving the frames 140 and 144 with suitable means as, for example, indicated by ropes 150, 151 which may be guided to a point near the observer by a pulley arrangement (not shown), the cross formed by threads 121 and 123 may be tilted into any possible inclination, whose amount can be read on scale and indicator arrangements 152, 153.

The vertical threads of Fig. 8 are here represented by thin, smooth rods 161 to 165 which move on suitable slide supports, for example carriages 166 running on rails 167 with rolls 168 and control ropes 169 leading to a point conveniently located near observer or clinician. The movement of these rods can be read on indicators 170.

The eyes L, R look through an aperture 17 which hides from vision all elements for supporting the test target threads, and through optical test means H.

For some observers it may be difficult to describe to the clinician fairly accurately how they see certain localizations of the test target; for such cases an indicator model may be provided such as, for example, shown in Fig. 10. This model may carry the upright elements in grooves 181 of a base board 182 and the cross on frames 183, 184. By means of knobs 185, the observer is able to move the indicator elements into any position corresponding to that in which the target proper is seen, for the purpose of unequivocally indicating his observations to the clinician.

The above-described concretely three-dimensional test targets are especially adapted for tests involving far distance vision; it will, however, be evident that they can easily be adapted for near vision tests by suitably changing the dimensions of the test elements. These changes presenting no difficulties with the present general description in mind, they do not require detailed description.

As already mentioned, tests according to the present invention can be carried out by presenting the targets stereoscopically. This can be done by direct stereoscopic observation or by stereoscopic projection.

Figure 11:
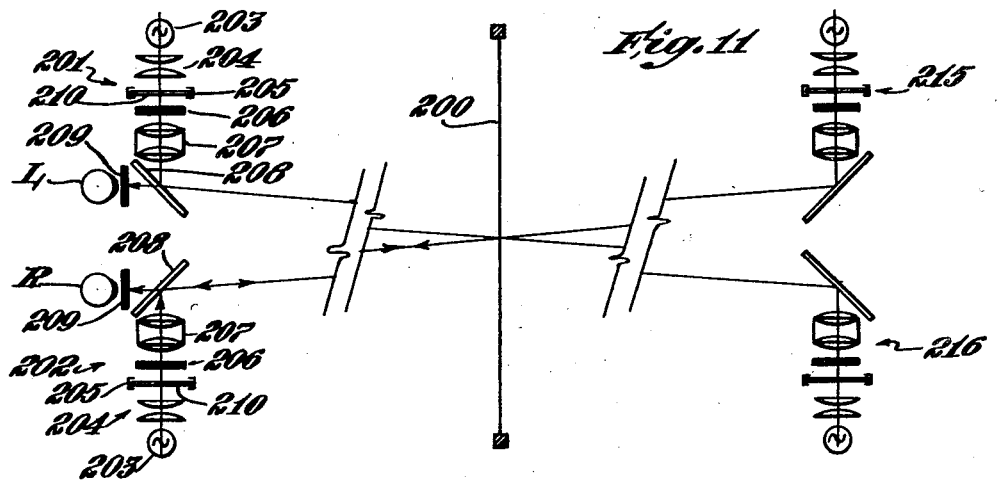
Fig. 11 is a schematic top view and Fig. 12 the corresponding side elevation of a stereoscopic projection arrangement according to the invention.
Figure 12:
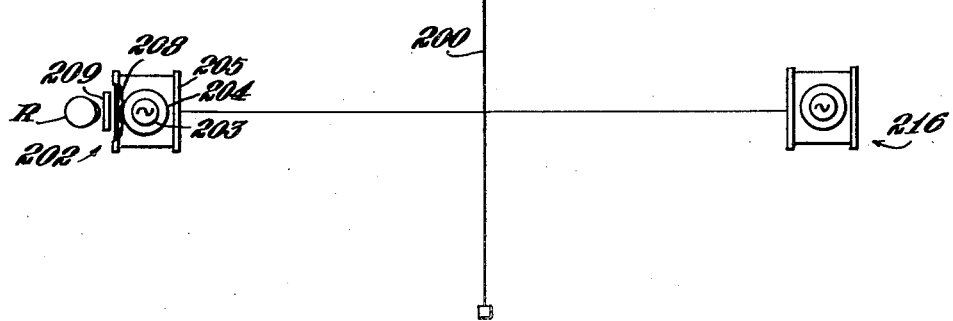

An arrangement of the last-mentioned type is shown in Figs. 11 and 12 in which the elements are only schematically indicated since the mechanical equipment is not part of the present invention and may be similar to that, for example, fully disclosed in my Patent No. 2,238,207. In Fig. 11, two projector systems 201, 202 are shown, each having a light source 203, a condenser system 204, a slide holder or film movement 205, a polarizer screen 206, an objective 207, and a transparent reflector 208. The reflectors are so arranged that the image-carrying light beams will effectively have the pupillary distance of eyes L, R which look through analyzer screens 209 and reflectors 208 towards screen 200 on which the records on slides or films 210 are projected.

Figure 13:
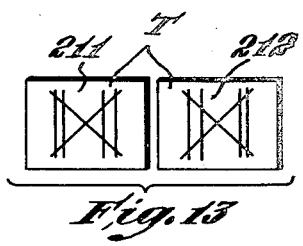
Figs. 13 and 14 show slides for use in arrangements according to Figs. 11 and 12.

The slides or films may carry any type of record suitable for purposes of the present invention, for example, such that will produce a stereoscopic target similar to the three-dimensional one according to Fig. 8. A pair of slides for projecting such target is schematically shown in Fig. 13 where 211 is the record for the left eye and 212 that for the right eye, constituting together a stereoscopic record T.

It may be desirable to add form factors in a manner permitting relative adjustment of the effects of a basic and an additional form factor. For that purpose, screen 200 may be of the nondepolarizing translucent type, with a second stereoscopic projector group arranged behind this screen, as indicated at 215 and 216 of Fig. 11. With the aid of these projectors 215 and 216, which are otherwise arranged quite similarly to systems 201 and 202, auxiliary slides, as for example shown in Fig. 14, may be projected on screen 200. Again, the slides consist of right and left eye records 217, 218 respectively, constituting a stereoscopic record F. The relative weight of patterns T and F can be adjusted by using slides representing selected form factors, or by controlling the relative intensities of a certain combination of slides.

Figure 15:
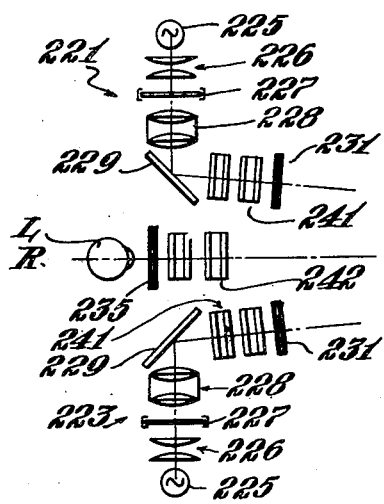
Fig. 15 is a schematic top view and Fig. 16 is a similar front view of a modification of the arrangement according to Figs. 11 and 12.
Figure 16:
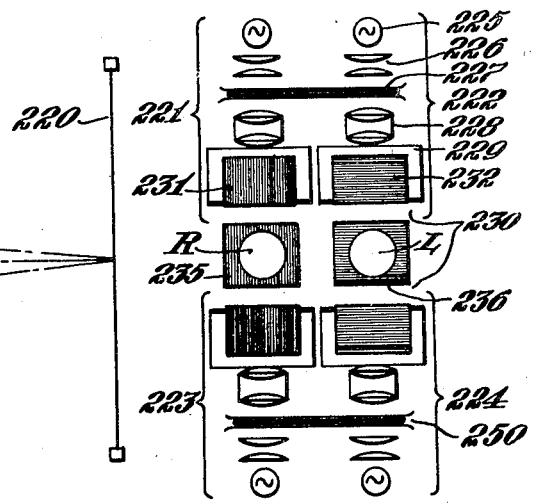

If it should be undesirable to project from both sides of a screen, an arrangement according to Figs. 15 and 16 may be employed. In these figures, 221 to 224 are four projector systems, each comprising illuminant 225, condenser system 226, slide holder or film gate 227, objective 228 and reflector 229. As indicated in the drawing, mirrors 229 are so arranged that they direct the image-carrying beams towards a nondepolarizing screen 220 but are sufficiently separated to permit observation of the screen, with eyes L and R looking through the opening between the mirrors.

Projector pairs 221, 222 and 223, 224 respectively may be of the twin type directly permitting projection through nodal points at pupillary distance, or they may be arranged similarly to projectors 201, 202 of Fig. 11, requiring in that case an additional mirror system.

Figure 14:
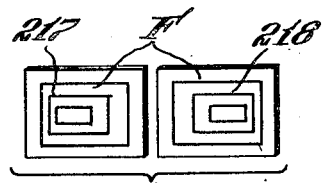

Series of records as exemplified by Fig. 13 may be projected through one of the projector pairs, and another series, as for example that of Fig. 14, through the other projector pair. By polarizing the projector beams in planes normal to each other, as indicated by screens 231, 232, and observing the projected image through correspondingly oriented analyzers 235, 236, stereoscopic observation is provided in well known manner. It will be noted that this arrangement avoids the use of transparent reflectors.

It will be understood that one of the projector pairs alone may be employed; an arrangement according to Figs. 15 and 16 which uses only projectors 223, 224 is indeed quite practical and fairly simple since it requires only a minimum of reflectors and the record pairs can be arranged on a common base, as indicated in Fig. 16 by slide plate or film 250.

The test target configuration can be changed in various ways. By consecutively using stereo slides or film frame pairs which record different target localizations, a continuously adjustable mechanical arrangement according to Fig. 9 can be very successfully simulated; by using optical heads similar to that shown at H in Figs. 2 to 6 in front of one or several projectors, as indicated at 241 of Fig. 15, a similar effect is obtained. In most cases it is desirable to arrange such heads before the eyes, as indicated at 242 of Fig. 15. If fixed projection records without projector heads are used, such an arrangement corresponds to those shown for example in Figs. 1, 2 and 8.

It will now be apparent that stereoscopically projected targets of the type described provide a very flexible arrangement since the type of target can be varied merely by changing the stereo records, so that the subject can be presented with the types of targets which are suitable for his particular condition, without leaving his headrest.

It will also be apparent that the target configuration can be continuously changed by using stereoscopic motion picture projection of consecutive records the difference of which is below the threshold required for persistance of vision.

Instead of using pairs of stereo records, superimposed records formed in terms of polarization characteristics as a function of density values (the so-called "Vectographs") can be used. An arrangement of this type is shown in Figs. 17 and 18 as applied to a near vision test.

In these figures, 18 is again a headrest, and 30 a support for an optical head H which, in this embodiment, may be tiltable about a hinge arrangement 250 for the purpose of permitting tests in reading position, as indicated, as well as for straight ahead vision for example with apparatus to be described with reference to Fig. 18. In Fig. 17, numeral 251 indicates a conventional motion picture projector using a single Vectograph film strip 252 moved through a film gate 253 by motor 254, for example by means of a conventional step-by-step motion which permits still picture projection of selected record frames. The necessary arrangements for protecting the film from excessive heat are of course provided in conventional manner not indicated in Fig. 17. The projected image is received on a translucent screen 255 and viewed through analyzers 256.

Figure 18:
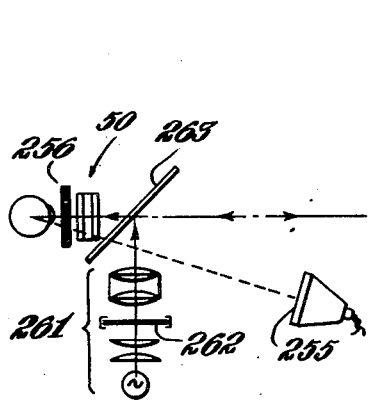
Fig. 18 is a schematic side elevation and Fig. 19 a similar front view of an arrangement incorporating the apparatus to Fig. 17.
Figure 19:
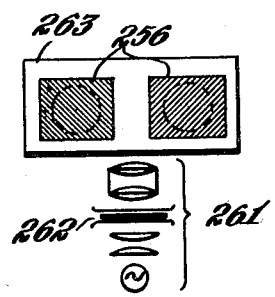

As indicated above, such records can be used with systems according to Figs. 11 to 16, in which case an arrangement schematically indicated in Figs. 18 and 19 is practical. In these figures, 261 is a projector which is arranged similar to unit 223 of Fig. 16 but which projects a Vectograph record 262 on screen 260 by means of a transparent reflector 263. It will be understood that the effective axes of the Vectograph records have to be arranged in directions which avoid, as much as possible, a disturbance of the polarization properties in which the records are defined. Analyzers 256 properly orientated with regard to the axes of record 262 are inserted before the eyes, if desired by means of a holder according to Fig. 17, which arrangement permits combination of far and near tests. For the latter test, lantern 261 and mirror 263 are swung from the field of vision, and the optical head is used as indicated in Fig. 17. For far tests, optical head H is swung into horizontal alignment and projector 261 with reflector 263 is moved into operative position, which position needs no further explanation in view of the preceding description of the embodiment according to Figs. 15 and 16.

For certain purposes involving mainly demontration and exercise, a simple mechanical stereoscope presenting mechanically adjustable targets may be useful. Such apparatus will now be described with reference to Figs. 20 and 21.

In Fig. 20, a track board 280, which may be supported on a stand 281 or equipped with a handle for holding it in the band of the observer, supports an eyepiece 282 and a target unit 283 whose distance may be adjustable by sliding one or the other or both lengthwise on board 280.

The eyepiece contains in the usual manner prisms 291 and magnifying lenses 292 for the purpose of providing proper convergence and accommodation conditions.

Target unit 283 may comprise one or two adjustable stereo targets of the type axonometrically shown in Fig. 21. In this figure, 291 and 292 are a rectangular and a circular frame respectively, which may be slidably attached to a holder 295 by means of dovetails 296.

Rectangular frame 291 carries in a recess, and secured by cover plate 296, four thread carrier frames 301 to 304, each having a lower bracket 305 and a similar upper bracket 305$^a$ (Fig. 20), which brackets carry stretched between them four threads 306 which, due to unequal length of the brackets, extend in a plane somewhat beyond the rear face of frame 291, as shown in Fig. 20. By means of screws 307 and hand knobs 308, threads 306 can be moved crosswise of the field of vision; by gearing together several of the screws 307, systematic simultaneous movement of the threads may be secured.

Circular frame 292 slidingly carries two rings 311, 312 having brackets 315 which carry cross-threads 316, 317. Part of each ring is provided with a recessed gear segment 318, which segments are drivingly connected by a planetary pinion 319. This pinion is fixed to a hand knob 321 rotating in a slider 322 which can be with some friction (if desirable augmented by spring pressure) moved in slot 323 of frame 292. By means of a slot and pin arrangement 324, hand knob 34 can be either arrested relatively to slide 322 and used for moving the slider in slot 323 or, with the pin disengaged from the slot, it can be used for rotating pinion 319. With the arrested hand knob, both frames 311, 312 can be moved together and cross 316, 317 rotated as a whole; with the knob disengaged, pinion 319 can be turned to move the frames in opposite direction, imparting to threads 316, 317 a scissors-like movement. As indicated in Fig. 20, threads 306 to 309 and 316, 317 are practically in the same plane. This adjustable thread target may be provided for one eye only in which case the other eye is presented with a similar pattern of fixed threads, or both eyes may have adjustable targets.

In order to eliminate any disturbing environmental elements from the field of vision, the thread-carrying frames are made sufficiently large so that the subject will be able to observe only the threads, through proper apertures fastened for example to eyepiece 282.

By suitably adjusting the position of the threads, a stereoscopic target corresponding to Fig. 13 may be formed, and if desired varied to investigate a systematic image incongruity of the observer. It will be evident that, instead of the above described adjustable threads, other mechanical elements as for example transparencies with adjustable portions, may be used, and that the particular target configuration shown, although found to be peculiarly well adapted for general purposes, may be replaced by others for analogous use under special conditions.

Instead of using mechanically adjustable stereoscopic targets as described with reference to Figs. 20 and 21, conventional stereoscopic slides with records for example similar to those of Fig. 13, may be used in connection with optical heads of the type described with reference to Figs. 2 to 6. Such targets may be either of the type having two juxtaposed records, or they may be of the above-mentioned "Vectograph" type with polarizing records superimposed on an opaque support. It will be evident that the last-mentioned modification is very similar to that described above with reference to Fig. 17. The stereoscopic targets of these various types may of course be used in connection with haploscopic viewing apparatus, in which instance several types, for example those according to Figs. 13 and 14, can be combined for simultaneous observation with the aid of transparent reflectors, in analogy with simultaneous projection as described with reference to Figs. 11 and 12.

Mechanically adjustable targets of the type described with reference to Figs. 20 and 21 may also be used as slides in projector apparatus according to Figs. 11 to 19. By suitably driving the movable elements, continuous change of the test target can be provided, analogous to that which results from operating the continuous change optical elements described with reference to Figs. 1 to 6, or from continuously moving the elements of a test target according to Fig. 9. It will now be evident without further explanation that the elements 24, 48, 56, of Figs. 2 to 6, and 308, 321, of Figs. 20 and 21, instead of being operated by hand can be attached to driving motors which may be controlled as to speed and period of operation in any suitable manner.

It will be apparent that instead of the above-described modes of stereoscopic representation of test targets according to the present invention, other known methods of stereoscopic presentation may be utilized. Although actually three-dimensonal targets and two-dimensional target records stereoscopically presented with polarized light have been found most suitable, it may sometimes be advantageous to use, for example, targets for anaglyphic observation, or interlaced stereoscopic records which are differentiated for the respective eyes by parallax apertures, or records projected through shutters driven synchronously with viewing shutters before the eyes.

The effect of various types of image incongruity upon the localization of objects in subjective sensation generally, and especially upon targets particularly selected as to form according to the invention, will now be described with reference to Figs. 22 to 33.

Having in mind the above-outlined theoretical considerations as to the nature of visual sensation, it is possible to select an external object or group of object elements of such configuration that its sensed form permits localization substantially only through the direct stereoscopic effect derived from the lateral spacing of at least two points $a, b$ (Fig. 22) defining a line segment at right angles to the median plane. If this object is swung into position $a', b'$, the right eye ocular image of $a', b'$ will obviously become laterally wider, as indicated in Fig. 22$^a$ where $al, bl$ and $ar, br$ represent the ocular images of $a', b'$ for the left and right eye, respectively. The significance of the ensuing relation of the two uniocular images is correlated to localization $a', b'$. Accordingly, if the image relation is in any manner changed in lateral direction so that angle $aRb$ is transformed into the larger angle $a'Rb'$, the element group $ab$ will be sensed as tilted into position $a'b'$, provided that other factors of spatial localization are not sufficiently strong to interfere. Such a change of image relation can be brought about by actually moving the object, as already mentioned, but it may also be effected by a magnifier before one eye, or by an inherent aniseikonic image difference.

Due to the postulated nature of the object an overall change of dimension or one ocular image relatively to the other will have the same effect.

For the same reason, change of dimensional relations in vertical meridians alone is meaningless as far as an object of this nature is concerned.

Generally speaking, the localization and form which characterize a visual sensation will be that which the object in question would have to have in order to give rise to the particular differences between the ocular images that are actually effected. If that particular difference between the ocular images could be produced by an object of some particular form and position, that object will be sensed, but when that particular difference between the ocular images could not be effected by any object in any position, that difference can then not give rise to any sensation.

Another type of external object can be selected which contributes to binocular localization through sensed spacing of its elements in up and down as well as in lateral direction. Such an object may include four points in a frontal plane, for example, $c, d, e, f$ of Fig. 23, and provided that the object is otherwise suitably selected as to its sensed form, as for example in the targets herein described, the localization of the object in subjective sensation will be affected by lateral meridional magnification of one ocular image relatively to the other, as pointed out above for points $a$ and $b$. For example, if the right eye ocular image $cr, dr, er, fr$ is wider than the left eye image $cl, dl, el, fl$, is shown in Fig. 23$^a$, this relation will correspond to rotation of $cdef$ into position $c'd'e'f'$.

If an object of this type is swung from the primary position $cdef$ along the empirical (Vieth-Müller) horopter circle VM into position $c'', d'', e'', f''$, the ocular images are affected so far as lateral dimensions are concerned, whereas the ocular images of verticals will be longer for the eye which is closer to that vertical. As indicated in Fig. 23$^b$, the left ocular image $cl, dl, el, fl$ will be of the same width, but higher than the right ocular image $cr, dr, er, fr$. The linear displacement of the object as a whole is nonsignificant in an environment of this type so that only the rotation is sensed. It will be evident from Figs. 23, 23$^a$ and 23$^b$ that lateral or vertical increase in the ocular image of a given eye relatively to that of the other eye will correspond to sensation of rotation of the object in opposite directions, respectively. Fig. 23$^b$ also indicates how the diagonal threads of a target according to Fig. 8 appear upon vertical magnification. The fact that this image difference is sensed as a rotation about a vertical axis is very easily comprehensible in this particular instance, if it is considered that the diagonals lack form elements that might indicate elongation of the threads.

Overall magnification of one image relatively to the other will have no effect on the sensed localization of such an object, for reasons based on the selected form of the test element groups in question, as pointed out above.

A further type of external object can be selected which contributes to binocular localization only through sensed correlation of its elements in vertical direction. Such an object may be represented for example by an element group or a line segment defined by points $g, h$ of Fig. 24. If such an object is tilted for example with the upper end $g$ coming nearer to the eyes into $g'$, the ocular images $gl, hl$ and $gr, hr$ will be inclined to each other, as indicated in Fig. 24$^a$. Conversely, if the ocular images of a vertical form element are inherently or artificially inclined to each other, the form element will be sensed as tilted forwardly or backwardly depending upon the relation of the images.

Such rotatory differences of the ocular images may be due to uniform rotation as indicated in Fig. 24ª, or to an effect corresponding to that of two obliquely meridional magnifiers as diagrammatically illustrated in Fig. 24ᵇ and explained in the above-cited patents. In this figure, a indicates the ocular image ellipses corresponding to an object circle n seen through oblique size cylinders. It will be observed that normal ocular image gl, gr, hl, hr is transformed into gl', hl', gr', hr' due to the fact that circle n appears through an oblique size lens as ellipse m.

An object of a form represented by two points g and h vertically one above the other will respond to either type of rotatory disparity by an apparent tipping, since in either case an image incongruity according to Fig. 24ª is effected. An object of a form represented by four points c, d, e, f in the oblique meridians as shown in Fig. 23, however, will respond (by itself and apart from response within a larger group) only to true cyclo rotation according to Fig. 24ª, because the oblique magnification effect merely changes the distance of opposite points, causing an incongruity which has no significance in the absence of other factors.

Still another type of external object can be selected which contributes to binocular localization mainly through asymmetry differences of the temporal and nasal sides, respectively, of the respective ocular images.

Such an object may be one which, as shown in Fig. 25, includes at least three points r, s, t in a horizontal line of a frontoparallel plane. Not considering incongruities due to physiological inhomogeneity of the retina, the angle sLt is smaller than the angle rLs, proportionate to the distance of the object. If there exists an abnormal asymmetry relation of the respective ocular images, as indicated by line v, the object will be abnormally localized with s' appearing out of line. Incongruities of this type, because of their very nature, must be investigated with objects having at least three elements which are affected in the manner just described and for that purpose the test according to the invention introduces a third point element 9 or 109 in the embodiments according to Figs. 1 and 7, and a third thread or rod 165 in the embodiments according to Figs. 8 and 9.

The above-described types of object form are especially significant and effective regarding spatial localization and hence essential in investigating the most important types of abnormal image incongruities; it will however be understood that the basic principle of the test according to the present invention is not bound to these particular types of stereoscopically effective object forms but can be applied to any object configuration which is typically significant as to spatial localization and related to a particular type of ocular image difference.

It will be apparent from the above discussion of ocular image difference that the especially significant types of such difference are dimensional differences including overall and horizontal or vertical meridional differences—further rotatory differences due to uniform angular displacement over the entire field, or due to magnification in oblique meridians—and finally asymmetric differences. These images differences can be artificially produced, in the above order, by overall or meridional size lenses of the type herein described with reference to Fig. 5—with roof prisms effecting uniform rotation of an image and with obliquely applied meridional size lenses as described with reference to Mc of Fig. 4—and with distortion prisms described with reference to Fig. 6.

It will now be evident in view of the general discussion presented hereinbefore that abnormal image differences of these types will be conductive to "abnormal visual sensation" as above defined, where localization through visual sensation does not agree with that ascertained by general inductive methods. It must, however, be kept in mind that binocular localization does not purely depend upon the factor of image difference but also on such factors as size and form which are effective in uniocular as well as in binocular vision and may, if sufficiently strong, outweigh the purely binocular factor of image difference. It is one of the main features of the test according to the present invention so as to control the uniocularly effective factors that types of abnormal visual localization which are due to binocular image difference cannot only be isolated and differentiated but also definitely correlated to certain types of such image difference.

In carrying out tests according to the principle of the invention, the subject is positioned relatively to the instrument, preferably by means of a conventional headrest, as indicated at 18 of Fig. 1. The instrument is first brought into normal position, with the point elements of Figs. 1 and 7 or the threads of Fig. 8 in the position shown in these figures, with the optical heads, if such are used, set to be optically ineffective or, if stereoscopic presentation is used, with the stereo records so selected and applied that, for the normal observer, normal visual sensation in the sense herein defined should ensue. The screening apertures 17 are checked to make sure that the subject sees only the target elements proper, without any supporting elements, against a neutral background. The subject is then asked to describe his visual sensation of the position of the test elements relative to himself and to each other. If the observer has no ocular image discrepancy, his visual sensation will be generally speaking normal, that is, he will describe the target elements as localized essentially at the points where he, or another person, would locate them with the aid of other than purely visual activity.

If the observer has an ocular image difference, he will sense the target in a certain way indicative of this difference. Analogously, it is possible to demonstrate to normal observers the localization resulting from ocular image incongruities by providing him with optical systems artificially introducing various types of such incongruities.

This relation between typical incongruities and localization of targets of the present type, and the manner in which the various types of abnormal localization can be differentiated, will now be described more in detail with reference to Figs. 26 to 28.

In Fig. 26 the legends in the first column indicate the types of ocular image difference in question, the second column graphically defines these types by the shapes of the ocular images Ir, Il of a frontoparallel circle seen with image differences of the respective types, and the third and fourth columns indicate, by way of plan views, the respective sensation of the target in question with the elements in normal position. The third column refers to a target according to Fig. 1, and the fourth to a target according to Fig. 8, as also indicated by the axonometric figures in the first row. The target elements are accordingly numbered. In order to facilitate the explanation of the various sensations of these targets, dependent on the respective image difference, the elements 1, 2, 3 and 4 of the target according to Fig. 1 and 131, 132, 133, 134 of Fig. 8 are referred to as group I, and elements 5, 6, 7, 8, 9 of Fig. 1 and 121, 123 of Fig. 8 as group II.

Referring first to the third column of Fig. 26 and assuming, as pointed out above, that the target elements are in normal position, a subject having an image size difference in the horizontal or 180° direction will see both point element groups I and II tilted about vertical axes. The sense of tilting depends on the eye for which the horizontal dimensions are larger, and the amount of tilting depends upon the amount of size difference. This sensation can be produced in a normal observer by means of an axis 90° size lens which magnifies in the 180° meridian. On the other hand, normal sensation can be restored to the abnormal subject who sees the target as indicated, by putting in front of his right eye an axis 90° size lens with the proper minification in the 180° meridian, for example by means of adjustable lens system M$h$ of Fig. 4. By mechanically moving the target elements into abnormal positions opposite to those indicated in Fig. 26, the abnormal observer can be caused to have the same sensation which a normal observer would have of the target elements in normal position. Needless to say, the same results can be obtained by means of the above-described stereoscopic targets for which a change in the relation of the two records corresponds to mechanical movement of the target elements of instruments according to Figs. 1 and 9.

A subject having an image size difference only in the vertical or 90° direction will sense only element group II tilted, and normal sensation can be restored to him by means of an axis 180° meridional size lens, for example trial lens system M$v$ of Fig. 4, minifying the vertical dimension of the image of his right eye.

A subject having an overall image size difference will see only group I tilted, and an overall magnifier before one of his eyes will restore to him normal visual sensation. For this purpose, the combined effect of systems M$h$ and M$v$ of Fig. 4 may be utilized.

A subject having a uniform rotatory image difference will see both groups I and II tilted about a horizontal axis; normal sensation could be restored by means of roof prisms or spectacles according to my Patent No. 1,908,296, dated May 9, 1933.

A subject having a rotatory difference due to oblique meridional magnification will see only group II tilted about a horizontal axis, since axis 45° or 135° meridional size lenses cannot significantly affect an object configuration whose elements are in these meridians, as will be evident from Fig. 24$^b$. Normal sensation can be restored by means of meridional size lenses with oblique axes, as for example trial system M$c$ of Fig. 4.

Figure 6:
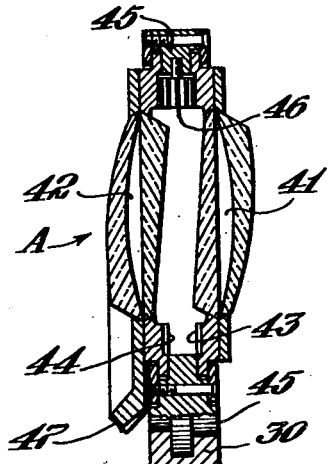
Fig. 6 is a similar section through an adjustable distortion system.

A subject having an asymmetric image difference will see the intermediate element of group II in front of or behind the plane of the other elements; normal sensation can be restored by means of a system similar to M$p$ of Figs. 4 and 6.

The reason why these element groups appear in abnormal sensation as above described will be evident from the above explanation referring to Figs. 22 to 25.

The fourth column of Fig. 26 indicates typical abnormal localizations of a target according to Fig. 8. The reason why the elements in question assume these particular apparent positions in the presence of the indicated image differences should be apparent from the above discussion referring to Figs. 22 to 25. It might, however, be pointed out again that vertical rods or threads lacking detail which might indicate vertical image differences respond directly only to horizontal differences including the horizontal component of overall size differences. Similarly, oblique threads do not directly respond to size differences in their oblique direction, which differences however effect rotatory image differences on meridians in all other directions. It should be noted in this connection that the third, central rod (165 in Fig. 9) is used only for the examination of image asymmetry and removed for all other purposes. Having this in mind, the reasons for the localizations indicated in the fourth column of Fig. 26 will become clearer, as follows:

A subject having an image size difference in horizontal direction will sense the vertical threads as well as the cross as tipped about a vertical axis, for reasons obvious from Figs. 22 and 22$^a$.

A subject having an image size difference in vertical direction will sense the vertical threads unaffected since, as above explained, they do not comprise any elements which could impart significance to this image difference. The cross, however, will tilt about a vertical axis, in the sense opposite to the apparent rotation due to abnormal horizontal size difference in the same ocular image, for reasons obvious from Figs. 23 and 23$^a$.

A subject having an overall size difference will sense the vertical threads as affected by the horizontal component alone, that is, the vertical threads will appear tipped accordingly; the relation of the images of the cross however is not affected, so that the cross threads will appear as in normal sensation.

A subject having uniform rotatory image difference might be expected to sense both element groups I and II tilted about a horizontal axis, in accordance with the explanation of Fig. 24. However, the configuration of element group I is such that, due to the above-explained synthesis or resolution of stimulus and memory components, the elements of group I are sensed as vertical, whereas group II, which does not comprise form elements of strong directional value, will respond to the image difference so that the cross is sensed as tilted about a horizontal axis within the vertical thread configuration.

A subject having an image difference due to oblique meridional magnification might be expected to sense the elements of group I as displaced in a manner similar to that caused by uniform rotatary discrepancy, and the cross constituting group II as not at all affected by this image difference. However, the resolution of stimulus pattern and memory factors of group I with its very strong localization factor of verticality outweights the effect of the image difference, whereas the image difference between group I and group II, characteristic of a tipping of I relatively to II is not effected. Since the cross does not contain a localization factor involving verticality it appears tilted about a horizontal axis, within vertical threads, in the sense opposite to that in which the vertical group I would appear to be tipped if it were not for the localization factor that prevents this particular abnormal sensation.

A subject having asymmetric image difference will sense the elements of group I as disaligned, for reasons which will be clear from the above discussion of Fig. 25.

The systematic abnormal sensations indicated in Fig. 26 for selected typical image differences will of course take place in the opposite direction if these differences occur in opposite sense. For example, if the image for the left eye should be horizontally larger than that for the right eye, the target would be sensed as tilted in the direction opposite to that shown in the second row of Fig. 26, namely, in clockwise instead of counter-clockwise direction.

This circumstance might lead to a confusion of the two types of rotational image difference, for example if targets of the type of Fig. 8 are used. In this case, similar abnormal localization is experienced for uniform rotatary image differences with the tops of vertical image meridians rotated inwardly, and for oblique magnification differences with the tops of the vertical image meridians rotated outwardly, and vice versa. These image difference types can be easily differentiated in accordance with the principles of the present invention, by following a procedure which will now be explained with reference to Figs. 27 and 28.

Fig. 27 indicates the cross and additional line of the rotatable target group according to Fig. 9 with thread 125 in oblique position, whereas Fig. 28 indicates the same target group with thread 125 in vertical position. If, now, the image difference is of the first-mentioned type, a meridional size lens applied with its axes in the directions of threads 121—123 and correcting that image difference, will not affect the localization of 121 and 123, and affect the localization of 125 the same amount in either position of that thread, if target and lens system are rotated between the positions of Figs. 27 and 28, respectively. This is due to the fact that this type of image difference conforms to the effect of such a lens which, as clearly indicated in Figs. 27 and 28, shifts the image of thread 125 equal angles α in either position of that thread. If the image difference is, however, of the oblique magnification type, a lens correcting this defect in one position cannot accomplish correction in other positions, because the rotary image difference varies in this instance with varying obliqueness of the meridian in question. Hence, in the case of oblique meridional magnification, the apparent position of 125 will be different in target positions according to Figs. 27 and 28 respectively. In this manner, the two types can be easily differentiated, uniform rotary difference being present when the sensation remains unchanged with rotation of the round frame of Fig. 9 and synchronous rotation of the lens system through 45°, whereas oblique meridional magnification difference is present when sensation differs for the respective positions.

It will now be evident that, according to the present invention, the target is so chosen and presented that different well defined and unequivocally discernible abnormal target sensations correspond to typical ocular image disparities and that, further, the target permits measurement of the amount of difference between normal and abnormal sensation in terms of localization as well as of the image disparity causing it, due to close correspondence of these two phenomena with target configurations of the present type. As pointed out previously, this target configuration is based on the principle of providing target element groups which respond differently to different combinations of types of abnormal localization and image difference, these target groups responding to image disparity by localization changes of amounts that are essentially proportionate to these disparities.

Targets of the type shown in Figs. 1 and 9 can be calibrated either functionally in terms of typically abnormal localization or in terms of image difference, for example by means of scales 152, 153, 167 of Fig. 9. The functional calibration is preferably in degrees of inclination of the target element groups, and in units of linear displacement of that element which responds to asymmetric image disparity.

As will be evident from the preceding theoretical discussion, changes in image disparity and the corresponding changes in localization can be brought about by mechanically moving the targets as well as by optically affecting the light coming from the targets; in other words, there is no essential difference (at least not in an experimental setup where functional activity of the subject is strictly controlled) how a certain significant difference of the two uniocular stimulus patterns is effected. Hence, the above-described measurements can also be made with the aid of the adjustable optical means described with reference to Figs. 2 to 6. The scales of these lenses can be calibrated to indicate the amount of image incongruity which they bring about, or to indicate the degree of corresponding abnormal localization. Thus, units $Mh$ and $Mv$ can be calibrated in per cents of meridional size difference or in angle degrees of rotation about a vertical axis of element group II (Figs. 8 and 26); unit $Mp$ (compare Figs. 4 and 6) can be calibrated in units of prismatic distortion (compare my Patent No. 2,118,132 of May 24, 1938) or in linear displacement of an asymmetry element of the target, as 165 of Fig. 8; unit $Mc$ (compare Figs. 5 and 6) can be calibrated in per cents of meridional size difference and degrees of inclination of the magnification axes (the latter by means of scales applied to the rotating device shown in Fig. 3) which two values define obliquely meridional size difference, or in degrees of rotation about a horizontal axis of element group II. It will be evident that size lenses for overall magnification and optical means providing uniform relative rotation of the images can be similarly employed, that the optical head need not include all the above-mentioned units if it is desired to test in this manner for only one or a few types of abnormal localization and image difference, and that the stepped components of a test lens set may be used instead of continuously adjustable systems.

Stereoscopic records as shown in Figs. 13, 14 and 21 are used analogously; record pairs of this type can be identified in terms of either localization or image incongruity.

With the above in mind it will now be evident that a subject having abnormal localization due to ocular image discrepancy, after having been placed for proper observation of the target in normal position, as above described, will be able to report unequivocally (if necessary with the aid of a model according to Fig. 10) his sensation of the instrument. The clinician, or the subject himself, can then adjust the relation of the latter's stimulus patterns until the target appears normal, that is, until its localization and form according to the subject's visual sensation thereof agree with its localization and form as ascertainable by general inductive methods of topographical measurement.

This adjustment of the stimulus patterns of the two eyes may take place in various ways. With targets according to Figs. 1 and 9, the target elements can be mechanically adjusted, and the amount of adjustment read on scales 152, 153 and 167 as above described.

Somewhat analogous to this mechanical adjustment is stereoscopic observation of adjustable targets according to Figs. 20 and 21, or stereoscopic observation of records simulating various target localizations by consecutive projection, either by suitably exchanging slides or by projecting stereo motion picture records of targets according to the invention. If slides are consecutively projected, the difference between consecutive stages of localization may be selected as small as suitable for the purpose at hand; if motion picture projection is used, the ratio of the continuous change can be suitably selected just as the frames of Fig. 9, or the optical systems of Figs. 2 to 6 can be adjusted at different speeds.

If fixed targets are used, as for example three-dimensional targets of the type shown in Fig. 8 or single stereoscopically projected slide pairs according to Fig. 13, the adjustment is carried out optically, as above discussed with reference to Figs. 2 to 6. In the latter instance, namely, that of stereoscopic projection, the optical adjustment can be made not only in the beams incident upon the eyes, but also in the projector beams, either by means of optical systems as for example indicated at 241 of Fig. 15, or by means of mechanical slide adjustment when targets similar to those shown in Fig. 21 are used as projector slides, as discussed above.

These various ways of adjusting the relation of the stimulus patterns transmitted through the respective eyes can of course be combined; optical compensation of abnormal sensation by means of trial lenses before the eyes will be preferably used if it is intended to provide the subject with spectacles designed to eliminate an ocular image disparity indicated by his abnormal localization.

The above-described types of abnormal localization may occur in combinations conforming to combined typical image differences. Since targets according to the present invention permit differentiation of these types, they can be separately measured, and evaluated in their effect upon each other.

It may sometimes be desirable to vary the relative effect of the various factors contributing to spatial localization; for example, it may be helpful to emphasize certain form characteristics by introducing configurations as the skeleton cube of Fig. 7 or the additional form element slides of Fig. 14.

The examination of the subject will include clinical techniques such as partial or overcompensation with one means and final compensation with another means, or bracketing of readings in order to arrive at a finally acceptable intermediate reading. The special technique used in each case will of course depend upon the individual requirements of the subject tested and the skill, experience and individual approach of the clinician carrying out the test, so that a description of such techniques would be without purpose in a description of the patentable features of the invention upon which such techniques are based.

Targets constructed according to the principles herein described may also be affected by such conditions of binocular vision as fixation disparity or retinal slip which envolve relative displacement rather than dimensional difference of the ocular images. Considering for example a target according to Fig. 8, the ocular images of a subject having vertical disparity will be vertically displaced relatively to each other. The target elements being devoid of any detail which might induce the sensing of form along the single dimension of these elements, this displacement will have no effect as far as the vertical threads are concerned. Due to the same cause, namely the lack of detail along the smooth threads or wires, the ocular images which are indicated in Fig. 29 will have the effect as if corresponding to lines with mid points $il$, $ir$ and $jl$, $jr$ respectively. Accordingly, the sensation will be that of two skewed lines whose separation increases with the amount of disparity. One or the other wire will be nearer the observer depending on the eye which has the upward disparity. If only a single oblique wire behind, or in front of, two verticals is used (as for example only elements 123, 131, 132 of Fig. 8) instead of the complete target, fixation disparity can be measured by mechanically or optically adjusting the observer's sensation until the oblique wire appears to touch a vertical wire; the amount of disparity can then be read directly on an appropriate scale of the instrument.

It should be understood that the present disclosure is for the purpose of illustration only and that this invention includes all modifications and equivalents which fall within the scope of the appended claims.

I claim:

1. A method for subjectively testing an observer's ability of localizing objects in space dependent upon the observer's ability correctly to position the hereinafter mentioned target elements relatively to the normal position of said targets, which method comprises the steps of presenting to the eyes of an observer two thread-like target elements in one fronto-parallel plane and each parallel to and at approximately equal distances from the opposite sides of the median plane, presenting two thread-like target elements in another fronto-parallel plane substantially spaced from said first mentioned fronto-parallel plane and parallel to and one on each side of the median pane and at approximately equal distances from said median plane, and presenting two filamentary target elements in a third fronto-parallel plane between and substantially spaced from said first and second fronto-parallel planes and intersecting said median plane at angles of approximately 45° near said visual plane, the said positions of the thread-like elements constituting the normal test target position, said thread-like target elements being substantially devoid of detail which can be sensed as to form in the longitudinal directions of said elements; eliminating from the observer's vision the end portions of said thread-like target elements and extraneous such as environmental objects; adjusting the position of said first and fourth target elements while maintaining them parallel to said frontal and median planes and adjusting the position of said fifth and sixth target elements by tilting them about substantially their point of intersection while maintaining them in a common plane, until said thread-like target elements appear to the observer to coincide with the normal position of the target elements; the amount of the adjustment of said thread-like elements relative to said normal position being a measure of the observer's ability to localize objects in space.

2. A method for subjectively testing an observer's ability of localizing objects in space dependent upon the observer's ability correctly to position the hereinafter mentioned target elements relatively to the normal position of said targets, which method comprises the steps of presenting to the eyes of an observer two thread-like target elements in one fronto-parallel plane and each parallel to and at approximately equal distances from the opposite sides of the median plane, and presenting two filamentary target elements in a second fronto-parallel plane substantially spaced from said first fronto-parallel plane and intersecting said median plane at angles of approximately 45° near said visual plane, the said positions of the thread-like elements constituting the normal test target position, said thread-like target elements being substantially devoid of detail which can be sensed as to form in the longitudinal directions of said elements; eliminating from the observer's vision the end portions of said thread-like target elements and extraneous such as environmental objects; adjusting the position of said first target element while maintaining it parallel to said frontal and median planes and adjusting the position of said third and fourth target elements by tilting them about substantially their point of intersection while maintaining them in a common plane, until said thread-like target elements appear to the observer to coincide with the normal position of the target elements; the amount of the adjustment of said thread-like elements relative to said normal position being a measure of the observer's ability to localize objects in space.

3. A device for subjectively testing an observer's ability of localizing objects in space dependent upon the observer's ability correctly to position the hereinafter mentioned target elements relatively to the normal position of said targets, comprising means for presenting to the eyes of an observer two thread-like target elements in one fronto-parallel plane and each parallel to and at approximately equal distances from the opposite sides of the median plane, means for presenting to the eyes of the observer two filamentary target elements in a second fronto-parallel plane substantially spaced from said first fronto-parallel plane and intersecting said median plane at angles of approximately 45° near said visual plane, the said positions of the thread-like elements constituting the normal test target position, said thread-like target elements being substantially devoid of detail which can be sensed as to form in the longitudinal directions of said elements; means for eliminating from the observer's vision the end portions of said thread-like target elements and extraneous such as environmental objects; means adjusting the position of said first target element while maintaining it parallel to said frontal and median planes and means for adjusting the position of said third and fourth target elements by tilting them about substantially their point of intersection while maintaining them in a common plane, until said thread-like target elements appear to the observer to coincide with the normal position of the target elements; the amount of the adjustment of said thread-like elements relative to said normal position being a measure of the observer's ability to localize objects in space.

4. Device according to claim 3 comprising in addition means for presenting to the eyes of the observer two thread-like target elements in a third fronto-parallel plane on the other side of and substantially spaced from said second fronto-parallel plane and parallel to and one on each side of the median plane and at approximately equal distances from said median plane.

5. A device for subjectively testing an observer's ability of localizing objects in space dependent upon the observer's ability to localize the hereinafter mentioned target elements relatively to the normal position of said target elements, comprising means for presenting to the eyes of an observer linearly arranged target elements appearing to the normal observer in two substantially spaced fronto-parallel planes and each parallel to and substantially spaced at opposite sides of the median plane, means for presenting to the eyes of the observer linearly arranged target elements appearing to the normal observer obliquely in a third fronto-parallel plane between and substantially spaced from said first mentioned fronto-parallel planes and intersecting the median plane near the visual plane, the said positions of the linearly arranged elements constituting the normal target element position and said target elements being substantially devoid of detail which can be sensed as to form in the longitudinal directions of said elements; and means for eliminating from the observer's vision the end portions of said target elements and extraneous such as environmental objects; the appearance of said target elements relative to said normal position being a measure of the observer's ability to localize objects in space.

6. Device according to claim 5 further comprising means for modifying the relation of the two images of said target elements as received in the observer's respective eyes while preserving the image form, by adjusting the light ray relation within at least one of the beams which proceed from said target elements to said eyes, whereby the amount of adjustment leading to apparently normal position of said target elements constitutes a measure of the observer's ability to localize and of said image relation.

7. A device for subjectively testing an observer's ability of localizing objects in space dependent upon the observer's ability to localize the hereinafter mentioned target elements relatively to the normal position of said target elements, comprising means for presenting to the eyes of an observer two thread-like target elements appearing to the normal observer in one fronto-parallel plane and each parallel to and at approximately equal distances at opposite sides of the median plane; means for presenting to the eyes of the observer two thread-like target elements appearing to the normal observer in a second fronto-parallel plane substantially spaced from said first fronto-parallel plane and intersecting said median plane at angles of approximately 45° near said visual plane, the said positions of the thread-like elements constituting the normal test element position, and said thread-like target elements being substantially devoid of detail which can be sensed as to form in the longitudinal directions of said elements; and means for eliminating from the observer's vision the end portions of said thread-like target elements and extraneous such as environmental objects; the appearance of said thread-like elements relative to said normal position being a measure of the observer's ability to localize objects in space.

8. Device according to claim 7 further comprising means for adjusting the appearance to the observer of the position of one of said first target elements while maintaining it parallel to said frontal and median planes and adjusting the appearance to the observer of the position of said third and fourth target elements by tilting them about substantially their point of intersection while maintaining them in a common plane, until said thread-like target elements appear to the observer to coincide with the normal position of the target elements.

9. Device according to claim 7 wherein said target elements are material thread-like bodies in said fronto-parallel planes.

10. Device according to claim 7 wherein said target elements are material thread-like bodies and which further comprises means for mechanically adjusting the position of one of said first target elements while maintaining it parallel to said frontal and median planes and means for mechanically adjusting the appearance to the observer of the position of said third and fourth target elements by tilting them about substantially their point of intersection while maintaining them in a common plane.

11. Device according to claim 7 further comprising optical lens means mounted before the observer's eyes for adjusting the appearance to the observer of the position of said first target element while maintaining it parallel to said frontal and median planes and for adjusting the appearance to the observer of the position of said third and fourth target elements by tilting them about substantially their point of intersection while maintaining them in a common plane.

12. Device according to claim 7 further comprising a fifth and a sixth thread-like target element appearing to the normal observer in a third fronto-parallel plane substantially spaced from and on the other side of said second fronto-parallel plane, said target elements being as to detail similar to said first and second elements and parallel to and at approximately equal distances at opposite sides of the median plane.

13. Device according to claim 7 further comprising a thread-like target element approximately in the intersection of said fronto-parallel and said median planes.

14. Device according to claim 7 further comprising a thread-like target element approximately in said median and second fronto-parallel planes.

15. A device for subjectively testing an observer's ability of localizing objects in space dependent upon the observer's ability to localize the hereinafter mentioned target elements relatively to the normal position of said target element, comprising means for presenting to the eyes of an observer two stereoscopically related test fields; differentiating means for showing to each eye only the test field which is stereoscopically related thereto; said test fields and said differentiating means delineating two thread-like target elements appearing to the normal observer in one fronto-parallel plane and each parallel to and at approximately equal distances at opposite sides of the median plane, and two thread-like target elements appearing to the normal observer in a second fronto-parallel plane substantially spaced from said first fronto-parallel plane and intersecting said median plane at angles of approximately 45° near said visual plane, the said apparent positions of the thread-like elements constituting the normal test element position, and said thread-like target elements being substantially devoid of detail which can be sensed as to form in the longitudinal directions of said elements; and means for eliminating from the observer's vision the end portions of said thread-like target elements and extraneous such as environmental objects; the appearance of said thread-like elements relative to said normal position being a measure of the observer's ability to localize objects in space.

16. A device according to claim 15 wherein said target elements are material bodies.

17. A device according to claim 15 wherein said target elements are material bodies which can be mechanically adjusted relatively to each other.

18. A device according to claim 15 wherein said differentiating means include optical lens systems which are mounted in front of the observer's eyes and which are adapted to modify the relation of the observer's images by adjustment of the light ray relation within the beams carrying the images of said target to the observer's eyes.

19. A device according to claim 15 wherein said test fields are records which polarize the light coming from said records in respective planes intersecting each other, and wherein said target presenting means include polarizing means which admit the light from each of said records only to the eye which is stereoscopically related to the respective record.

20. A device for subjectively testing an observer's ability of localizing objects in space dependent upon the observer's ability to localize the hereinafter mentioned target elements correctly relatively to the normal position of said target elements, comprising screen means; means for presenting to the eyes of an observer by projecting on said screen means two stereoscopically related test target images; differentiating means for showing to each eye only the test target image which is stereoscopically related to said eye; said images and said differentiating means delineating two thread-like target elements appearing to the normal observer in one fronto-parallel plane and each parallel to and at approximately equal distances at opposite sides of the median plane, and two thread-like target elements appearing to the normal observer in a second fronto-parallel plane substantially spaced from said first fronto-parallel plane and intersecting said median plane at angles of approximately 45° near said visual plane, the said apparent positions of the thread-like elements constituting the normal test element position, and said thread-like target elements being substantially devoid of detail which can be sensed as to form in the longitudinal directions of said elements; and means for eliminating from the observer's vision the end portions of said thread-like target elements and extraneous such as environmental objects; the appearance of said thread-like elements relative to said normal position being a measure of the observer's ability to localize objects in space.

21. A device according to claim 20 wherein said differentiating means include means for projecting said images with light so polarized that the respective planes of polarization are inclined to each other, and analyzing means one before each eye of the observer and arranged to admit to the respective eye only light carrying the image intended for that eye.

22. A device according to claim 20 further comprising means for modifying the relation of the observer's images of said test target images by adjustment of the relative light ray configuration of the beams carrying said images, said adjustment means including an optical lens system means before the observer's eyes.

23. A device according to claim 20, further comprising means for modifying the relation of the observer's images of said test target images by adjustment of the relative light ray configuration of the beams carrying said images, said adjustment means including optical lens system means between said projecting means and said screen means.

24. A method for subjectively testing an observer's ability of localizing objects in space dependent upon the observer's ability to localize the hereinafter mentioned target elements relatively to the normal position of said target elements, which method comprises the steps of presenting to the eyes of an observer linearly arranged target elements appearing to the normal observer in two substantially spaced fronto-parallel planes and each parallel to and substantially spaced at opposite sides of the median plane presenting to the eyes of the observer linearly arranged target elements appearing to the normal observer obliquely in a third fronto-parallel plane between and substantially spaced from said first mentioned fronto-parallel planes and intersecting said median plane near the visual plane, the said positions of the linearly arranged elements constituting the normal target element position and said target elements being substantially devoid of detail which can be sensed as to form in the longitudinal directions of said elements; and eliminating from the observer's vision the end portions of said target elements and extraneous such as environmental objects; the appearance of said target elements relative to said normal position being a measure of the observer's ability to localize objects in space.

25. Method according to claim 24 further comprising the step of modifying the relation of the two images of said target elements as received in the observer's respective eyes by adjusting the light ray relation within at least one of the beams which proceed from said target elements to said eyes, whereby the amount of adjustment leading to apparently normal position of said target elements constitutes a measure of the observer's ability to localize and of said image relation.

26. A method for subjectively testing an observer's ability of localizing objects in space dependent upon the observer's ability to localize the hereinafter mentioned target elements relatively to the normal position of said target elements, which method comprises the steps of presenting to the eyes of an observer two thread-like target elements appearing to the normal observer in one fronto-parallel plane and each parallel to and at approximately equal distances at opposite sides of the median plane, and presenting to the eyes of the observer two thread-like target elements appearing to the normal observer in a second fronto-parallel plane substantially spaced from said first fronto-parallel plane and intersecting said median plane at angles of approximately 45° near said visual plane, the said positions of the thread-like elements constituting the normal test element position, and said thread-like target elements being substantially devoid of detail which can be sensed as to form in the longitudinal directions of said elements; eliminating from the observer's vision the end portions of said thread-like target elements and extraneous such as environmental objects; the appearance of said thread-like elements relative to said normal position being a measure of the observer's ability to localize objects in space.

27. Method according to claim 26 comprising in addition the step of presenting to the eyes of the observer two thread-like target elements appearing to the normal observer in another fronto-parallel plane on the other side of and substantially spaced from said second fronto-parallel plane and parallel to and one on each side of the median plane and at approximately equal distances from said median plane.

28. Method according to claim 26 further comprising the step of adjusting the appearance to the observer of the position of said first target element while maintaining it parallel to said frontal and median planes and adjusting the appearance to the observer of the position of said third and fourth target elements by tilting them about substantially their point of intersection while maintaining them in a common plane, until said thread-like target elements appear to the observer to coincide with the normal position of the target elements.

ADELBERT AMES, Jr.

REFERENCES CITED

The following references are of record in the file of this patent:

UNITED STATES PATENTS

| Number | Name | Date |
| --- | --- | --- |
| 2,033,634 | Higley | Mar. 10, 1936 |
| 2,209,728 | Higley | July 30, 1940 |
| 2,230,993 | Ames, Jr., et al. | Feb. 11, 1941 |
| 2,126,713 | Ames, Jr., et al. | Aug. 16, 1938 |
| 2,168,308 | Ames, Jr. | Aug. 8, 1939 |
| 2,238,207 | Ames, Jr. | Apr. 15, 1941 |
| 1,954,399 | Ames, Jr. | Apr. 10, 1934 |
| 896,814 | Ely | Aug. 25, 1908 |
| 1,850,168 | Covelle | Mar. 22, 1932 |
| 2,131,232 | Ogle | Sept. 27, 1938 |
| 1,423,091 | DeZeng | July 18, 1922 |
| 2,026,607 | Bennett | Jan. 7, 1936 |
| 2,196,905 | Sherman | Apr. 9, 1940 |
| 2,101,842 | Etzel | Dec. 14, 1937 |
| 2,031,358 | Bartholowsky | Feb. 18, 1936 |
| 1,929,250 | McGiffert et al. | Oct. 3, 1933 |
| 2,340,856 | Ames, Jr. | Feb. 8, 1944 |
| 2,362,588 | Shepard | Nov. 14, 1944 |
| 2,362,857 | Renshaw | Nov. 14, 1944 |
| 1,952,084 | Marten | Mar. 27, 1934 |

FOREIGN PATENTS

| Number | Country | Date |
| --- | --- | --- |
| 18,721 | British | Sept. 1, 1898 |

OTHER REFERENCES

J. O. S. A. (Kellner), volume 7, 1923, pp. 857–860. (Photostatic copy in Div. 7.)

Helmholtz, Physiological Optics, translated by Southhall, 1925, volume III, pages 450–455, used in rejecting certain claims (pages 488–491, 501, 502, in volume III are cited as showing related art with respect to disparate images, etc.). (Copy in Div. 7.)

Field Studies and Fusion Training with the Stereo Campimeter, pub. by Bausch & Lomb, 1931, pgs. 10, 13–16 incl. (Div. 7 copy.)

Modern Visual Training with Ortho-Fusor, pub. by Bausch & Lomb (H-406, 4, VII—42), 1942, pp. 6, 10, 17.

Kellner article in J. O. S. A., vol. 7, 1923, pp. 857–860. (Photostatic copy of said pp. in 88/20 E.)